March 20, 1928. 1,663,209
E. B. McCABE
HEAT INTERCHANGER
Filed June 3, 1927
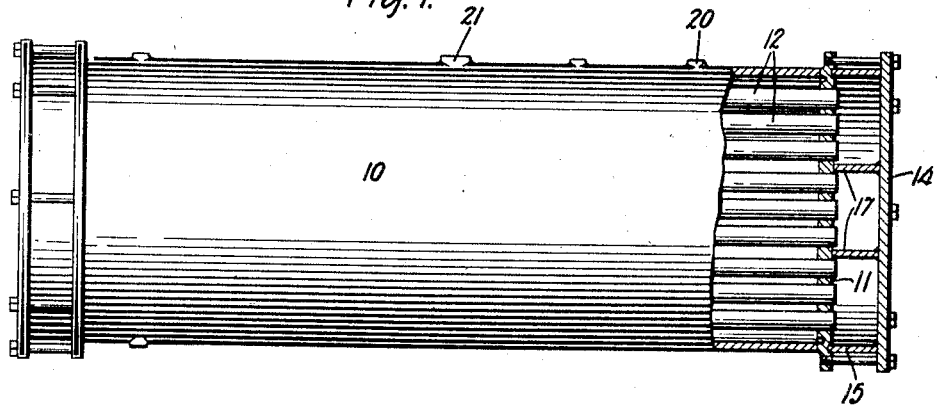
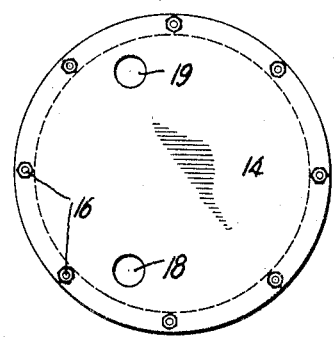
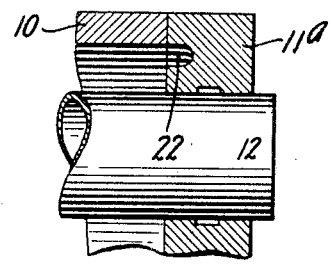
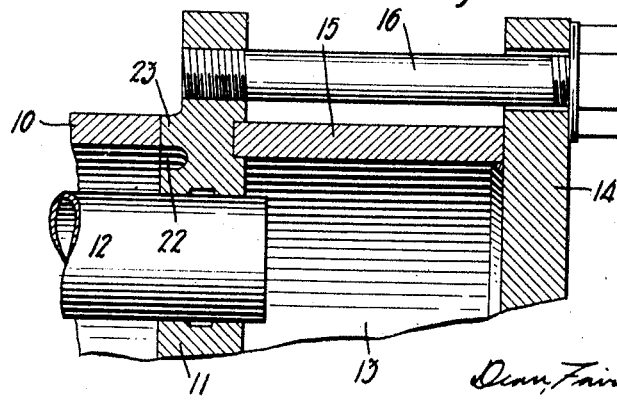
Inventor
Edward B. McCabe.
by
Dean, Fairbank, Albright & Hirsch
Attorneys Patented Mar. 20, 1928.

1,663,209

UNITED STATES PATENT OFFICE.

EDWARD B. McCABE, OF CARBONDALE, PENNSYLVANIA, ASSIGNOR TO CARBONDALE MACHINE COMPANY, OF CARBONDALE, PENNSYLVANIA, A CORPORATION OF PENNSYLVANIA.

HEAT INTERCHANGER.

Application filed June 3, 1927. Serial No. 196,188.

This invention relates to heat interchangers of the multiple tube type in which parallel tubes are supported by a tube sheet forming an end wall or a transverse partition in a shell. The invention relates more particularly to the means employed for securing the tube sheet to the shell.

If these parts be detachably secured and a packing is relied upon to effect a liquid-tight joint, a leak often occurs due to expansion, contraction and erosion of the metal parts and the deterioration of the packing. Various attempts have been made to electrically weld the end of the shell to the face of the tube sheet, but it is difficult to secure a perfect joint. I have discovered that this difficulty is in part due to the fact that the tube sheet is usually of very much thicker metal than is the shell, and the thinner shell is liable to burn from the high heat whereas the thicker section radiates or conducts away the heat and does not become heated to the proper temperature.

In carrying out my invention I secure a perfect weld as well as smooth inner and outer surfaces at the welded joint by cutting a groove in the inner face of the tube sheet so as to leave a ridge or flange of the same thickness as the wall of the shell, and of the same internal and external diameters as the latter. In this way two tubular portions of the same thickness of metal are brought into abutting engagement, and a perfect electrically welded joint may be produced.

In the accompanying drawings I have illustrated merely one form of heat interchanger to which my invention may be applied. In these drawings:

Fig. 1 is a side elevation.

Fig. 2 is an end view.

Fig. 3 is a section similar to a portion of Fig. 1, but on a very much larger scale, and Fig. 4 is a section of a slightly modified form.

I have illustrated my invention as applied to a heat interchanger adapted for the cooling of brine by ammonia or other liquefiable gaseous refrigerant. The heat interchanger or cooler includes a tubular shell 10, a pair of tube sheets 11, and a plurality of parallel brine tubes 12. The latter are supported in the tube sheet and extend into chambers or compartments 13 at the ends. These may be formed in any suitable manner as for instance by means of a head 14 provided with a peripheral wall 15 which may be welded thereto and engage a groove or seat in the tube sheet 11. The head and tube sheet may be detachably connected by means of bolts 16 and the chamber 13 may be divided into compartments by partitions 17 whereby liquid may enter one through an opening 18, thence lengthwise of the coolers through certain of the tubes and back through the others. The partitions may be located to divide the tubes into groups and form a zigzag path for the brine from the brine inlet 18 to a brine outlet 19. The liquefied refrigerant may be delivered to the chamber between the tube sheets and within the shell, for instance through a pipe connection 20, and the gasified refrigerant may be withdrawn from any point at the top, for instance a pipe connection 21.

The heat interchanger above described is merely one to which I may apply my invention. In applying the invention I cut into the tube sheet 11 an annular groove 22, and if necessary cut away the outer portion so as to leave a short cylindrical flange 23 of the same internal and external diameters as the shell 10. By reason of the fact that the flange is of the same thickness as the shell smooth surfaces are produced both on the inside and on the outside, and the rate of heat conduction from the joint during the welding operation is substantially equal in opposite directions.

Although in Fig. 1 the interchanger is shown in a horizontal position, it will be evident that the invention is equally applicable to a vertical type of device, and that the compartments and specific form of heads are not essential. In Fig. 4 I have shown a construction in which the tube sheet 11ª has an outside diameter equal to that of the tube sheet 10. Therefore it is not necessary to cut away any of the outer portion, but only to cut the groove 22 in order to form the flange.

Having thus described my invention, what I claim as new and desire to secure by Letters Patent is:—

1. A heat interchanger having a tube sheet provided with a groove in the inner surface thereof to form a short cylindrical flange and a shell of substantially the same internal and external diameters as said flange, and butt-welded thereto.

2. A heat interchanger including a tube sheet, a plurality of tubes supported thereby, and a shell encircling said tubes, said tube sheet having a portion of one surface cut away to leave a cylindrical flange upon one face thereof, and of substantially the same internal and external diameters as said shell, said flange and said shell being electrically welded together.

3. A process of making heat interchangers, which includes the steps of cutting an annular groove in one face of a tube sheet so as to leave a cylindrical flange of substantially the same internal and external diameters as that of the shell, and electrically welding the end of the shell to the end of the flange.

Signed at Carbondale, in the county of Lackawanna and State of Pennsylvania, this first day of June, A. D. 1927.

EDWARD B. McCABE.